April 12, 1927.

E. P. DEVINE 1,624,658

LENS GRINDING MACHINE

Filed June 7, 1924      2 Sheets-Sheet 1

INVENTOR.
EDWARD P. DEVINE.

BY

ATTORNEYS.

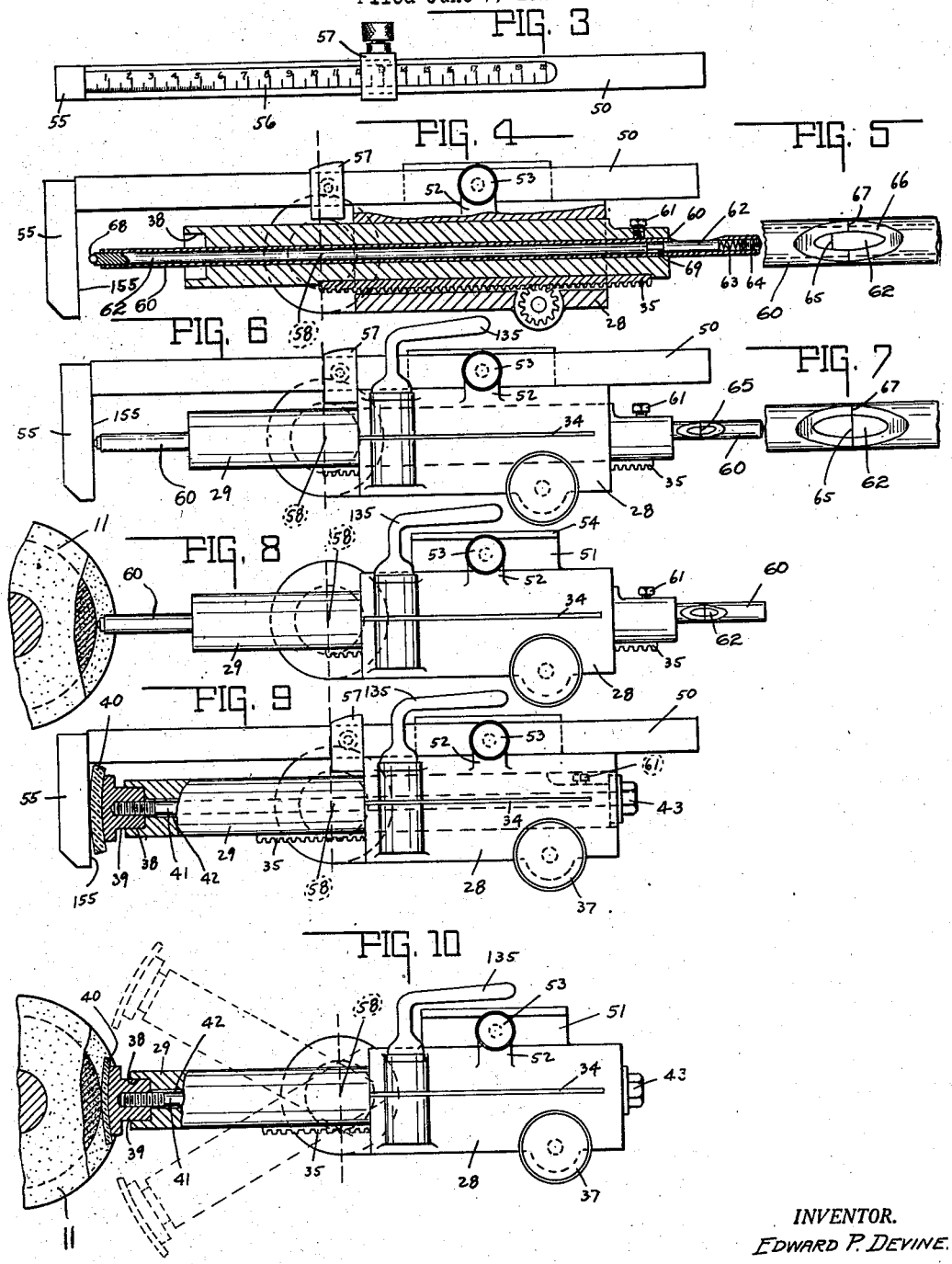

Patented Apr. 12, 1927.

1,624,658

UNITED STATES PATENT OFFICE.

EDWARD P. DEVINE, OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

LENS-GRINDING MACHINE.

Application filed June 7, 1924. Serial No. 718,471.

The object of this invention is to improve means for the adjustment of the lens holding mechanism in machines of the type shown in the application of Lucian W. Bugbee, filed July 23, 1923, Serial No. 653,367, for a machine for generating toric surfaces on lenses.

The chief feature of my improvement in said adjusting means is a yielding removable gauge adjustable in the spindle of the lens holding means. It cooperates with the head of a radius gauge bar for the preliminary setting of the lens holding means at the center of its oscillation or radial center, and in setting said mechanism in position with reference to such grinder, said gauge rod safeguards and does not injure the peripheral grinding surface of the grinder or injure, spring or dislocate the gauge bar. Heretofore, it has been required to have tissue paper or other safeguarding means between the grinding surface of the grinder and said setting or adjusting means. With this invention, grinder protective means outside of the apparatus is rendered unnecessary.

Another feature of the invention is the provision of a gauge tube longitudinally adjustable in the lens holding spindle and a yieldingly mounted gauge bar in said tube, and indicating lines for adjusting one with reference to the other so as to facilitate the adjustment of the lens holder with reference to the grinder.

Figure 1:
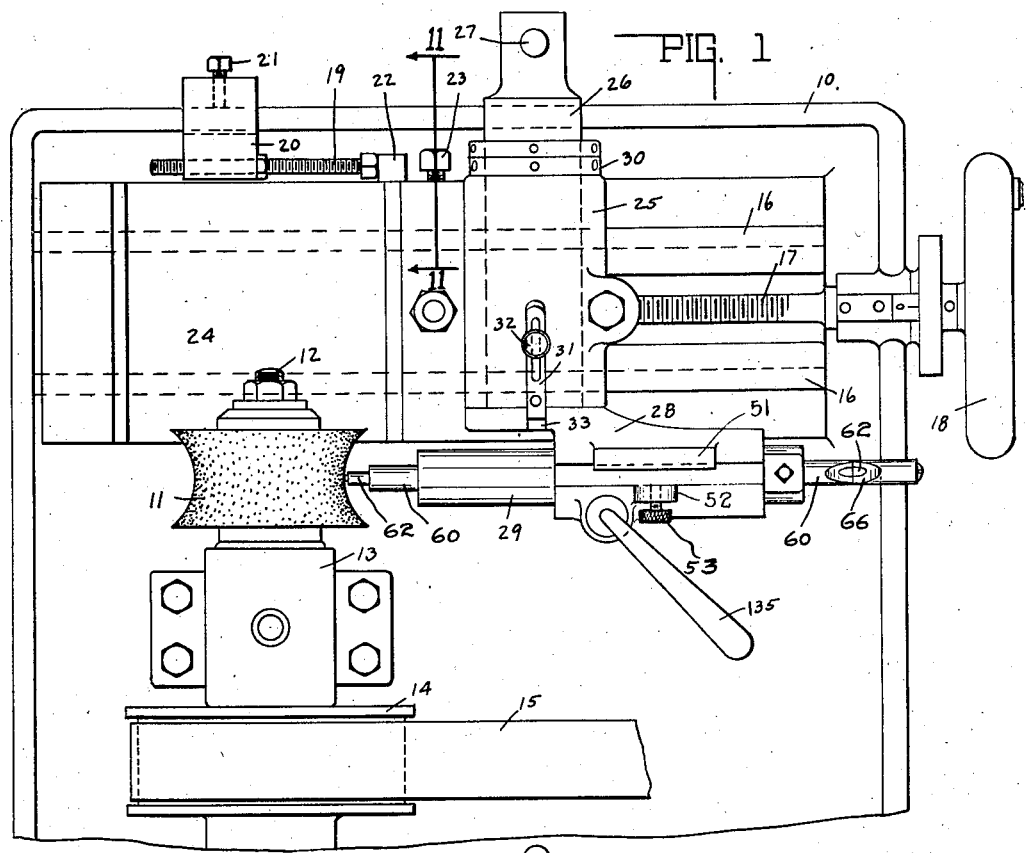
Figure 11:
Figure 2:
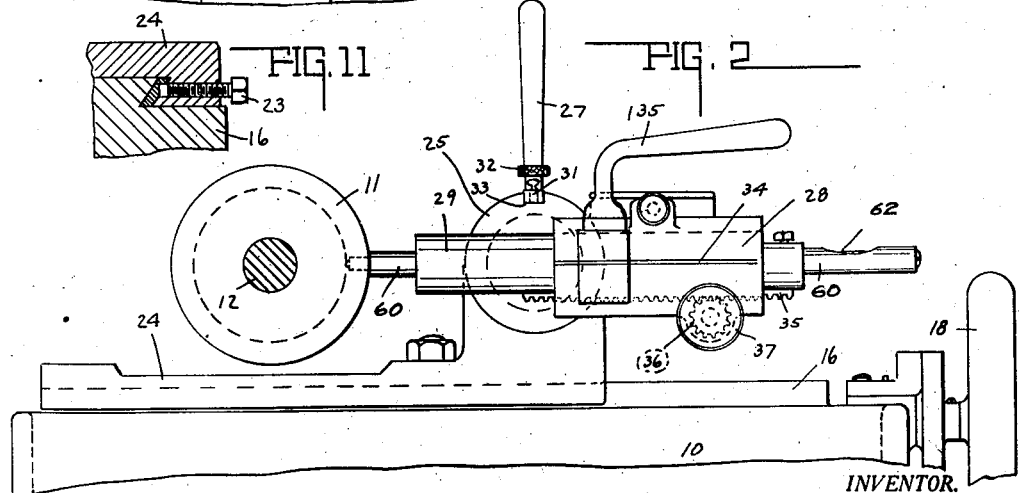

The full nature of the invention will be understood from the accompanying drawings and the following description and claims:

In the drawings, Figure 1 is a plan view of the main portion of the total machine, a part being broken away. Fig. 2 is a side elevation of the upper part of the machine, as shown in Fig. 1. Fig. 3 is a plan view of the scale bar used in determining the proper radial adjustment of the lens holder. Fig. 4 is a central vertical section through the lens holder and associated parts and a side elevation of said gauge bar and showing the parts after the gauge bar has been applied, but before the mechanism has been operated for adjustment. Fig. 5 is a plan view of the right-hand end of the gauge tube and gauge rod shown in Fig. 4, on an enlarged scale to show the registration lines. Fig. 6 is a side elevation of what appears in Fig. 4, with the parts in position to determine the proper radius of oscillation of the lens holder means. Fig. 7 is a plan view of the gauge tube and gauge rod at the right-hand end of Fig. 6, shown on an enlarged scale. Fig. 8 is the same as Fig. 6 with the gauge bar removed and the grinder partially shown in side elevation and partially broken away. Fig. 9 is a side elevation of what is shown in Fig. 6 after the gauge tube and gauge rod have been removed from the lens holder spindle and the lens holder has been secured to the spindle. Fig. 10 is the same as Fig. 9 after the gauge bar is removed and showing the grinder as in Fig. 8 in position to grind the lens, different positions of the lens holder being indicated by dotted lines. Fig. 11 is a vertical section on the line 11—11 of Fig. 1.

On the machine herein shown there is a rectangular frame 10 supported by means not shown which carries a rotary grinding wheel 11 on the shaft 12 mounted in a bearing 13 and there is a pulley 14 on the shaft 12 for driving the wheel and a belt 15 from a source of power for driving the pulley.

The remaining mechanism shown herein is for mounting and adjusting the lens holding and operating means. There is a carriage plate 24 slidable towards and from the grinder. It slides on the guide bars 16 and is horizontally adjustable by a feed screw 17 operated by a hand wheel 18. The feeding movement of the carriage is stopped by a stop bolt 19 held by a block 20 adjustable on the frame 10, as seen in Fig. 1, and set by a screw 21. The stop screw 19 is engaged by a stop block 22 secured on the edge of the carriage 23. This stop means is for the purpose of preventing the carriage 24 being fed so far to the left as to cause the grinder to be injured by the gauging means or lens holder while adjusting the machine, preparatory to grinding a lens. The carriage is held in fixed position by a set screw 23 which extends through to the guide bar 16, as shown in Fig. 11.

On the carriage 24 there is a housing 25 transversely thereof, as seen in Fig. 1, in which a shaft 26 is mounted, which shaft carries and oscillates the lens holding mechanism. The shaft is oscillated by a handle 27, as shown in Fig. 2. Housing 25 extends from a housing 28 for the lens holding spindle 29, as shown in Fig. 1, and the shaft 26 is held in place by the collars 30. When the lens holding mechanism is horizontal, it and shaft 26 may be locked against rotation by a latch 31 slidably mounted in the shaft housing 25, which is moved by a finger piece 32 thereon. The latch 31 is slidable in a slot in housing 25 and is adapted to enter a notch 33 in the housing 28 for the lens holding spindle.

The lens holding spindle 29 is longitudinally adjustable in the housing 28, which housing is split at 34, as seen in Fig. 2, and the spindle may be clamped in said housing against longitudinal movement by a clamp 135. When the spindle is free to move in the housing, it is moved longitudinally by a rack 35 on the underside of the spindle 29 and extending through the housing and meshing with a gear 36, shown by dotted lines in Fig. 2, on a bolt that is turned by a finger knob 37.

The spindle 29, as shown in Fig. 10, is recessed at 38 in its end to receive a lens block 39 on which a lens 40 may be secured for grinding; and the lens block 39 is held in position by a screw rod 41 which extends loosely through a tubular opening 42 longitudinally through the spindle 29 and which is tightened by a nut 43 at the other end.

The foregoing mechanism constitutes the machine for grinding toric lenses. When the parts are adjusted and being operated, the lens is moved to and against the grinder by oscillating the lens holding means vertically, as seen in Fig. 10. The means for adjusting the lens holding means and method of using the same will now be explained:

There is a gauge bar 50, as seen in Figs. 3 and 4, which has a longitudinal portion that is insertable between the bar holding plate 51, see Fig. 8, on the housing 28, and a lug 52 that has a set screw 53 in it in position to clamp the bar 50 in adjusted position. The plate 51 has an overhanging lip 54 which prevents vertical escape of the bar 50. Said gauge bar 50 has a head 55 which for adjusting purposes takes the place of the grinder 11. The bar is longitudinally adjustable in its holding means just described and is placed so that the inner face 155 of the head 55 will correspond with the central part of the grinding surface of the periphery of the grinder, as seen in Figs. 6 and 8.

The grinding radius of the lens holding means and also the position at which the carriage should be set to fix the fulcrum or center of said oscillation is determined by means of a millimeter scale 56 on top of the bar, which is seen in Fig. 3, on which there is a setting slide 57 adjustable so that the left-hand face thereof next to the head 55 of the gauge bar will be at a distance from the face 155 of the gauge bar, which is equal to the radius of curvature desired to be generated on the lens. Then the gauge bar is moved from the position shown in Fig. 4 to that shown in Fig. 6, wherein the setting slide 57 abuts against the housing 28. The thickness of the setting slide 57 is exactly equal to the distance between the left-hand face of the housing 28 and the center point 58 of oscillation of the lens holding mechanism, said center of oscillation being the axis of the shaft 26 and shown by dotted lines in Fig. 6. The foregoing adjustment properly locates the head of the gauge bar for the next step in the process of adjustment.

The next step in the process of adjustment of the lens holding mechanism is to properly locate the lens holding spindle 29 in its housing 28 so it will present the lens to the grinder. For this purpose, the tubular spindle 29 has in it a compound gauging means consisting of a gauge tube 60 longitudinally slidable in the central opening through the spindle, as seen in Fig. 4, and being held therein when adjusted by a screw 61. Within the gauge tube 60 there is a gauge rod 62 longitudinally adjustable and yieldingly forced towards the head 55 of the gauge bar 50 by a spring 63 lying between the right-hand end of the rod 62 and a screw 64 in the end of the tube 60. This screw 64 enables the tension of the spring 63 to be adjusted. The gauge rod 62 has on its right-hand end a gauge line 65 and lying under a cut 66 in the tube 60, as seen in Fig. 5, and said cut 66 of tube 60 has a gauge line 67. At the end of the gauge rod 62, adjacent the head 55 of the gauge head 50, there is a rounded end 68 to provide a delicate means for engaging the grinding surface of the grinder during the adjustment so a not to injure the same and that also is the purpose of the yielding spring 63. The left-hand movement of the rod 62 under the influence of the spring 63 is limited by a stop 69 in the tube 60, see the right-hand end of Fig. 4. That does not permit the rod to extend further to the left in tube 60 than is shown in Fig. 4, but permits it to move to the right.

In making the adjustments illustrated in Figs. 4, 6 and 9, the housing 28 and associated mechanism is oscillated preferably to the upper dotted position indicated in Fig. 10, so that the lens holding means will be out of the way of the grinder.

The operation and use of the adjusting means is as follows: To set the gauge so as to provide for a predetermined grinding radius, the lens holding means is tilted to the upper dotted line position in Fig. 10 and the gauge put in place as in Fig. 6 and above described.

Then the gauge rod and tube are placed in the lens holder and clamped therein by the screw 61 and preferably left in a position such that the line 67 on the cut-away portion of the tube 60 will extend to the right of the line 65 on the rod 62, as seen in Fig. 5, so that the said parts will be visible while the adjustment is being made for setting the gauge rod and indicating the gauge radius for oscillating the lens holder. Then by turning the nut 37 the lens holder is moved with the gauge rod from the position shown in Fig. 4 to the position shown in Fig. 6. The clamp 135 then clamps the lens holder in said position with the lines 65 and 67 in registration.

Although the registering lines 65 and 67 and cut out portions 66, as described, are desirable, they are not necessary, as the gauge bar 50 can be reset from the position shown in Fig. 4 to that shown in Fig. 6 with the adjusting stop 57 against the housing 28, and thereafter the tube 60 and rod 62 moved to the left until the point touches the head 55 of the gauge bar and then the set screw 61 tightened to hold the tube 60 in place in the spindle. Then the carriage can be moved to the right so as to withdraw the end of the rod 62 from engagement with the head 55 of the carriage bar and the latter can be removed.

Then the gauge bar 50 is removed and the lens holding means turned to a horizontal position, as shown in Fig. 8, and then the carriage 24 is moved up until the end 68 of the gauge rod 62 touches the center of the grinder, as seen in Fig. 8. Said grinding face will not be injured by such operation because of the yielding mounting of the rod 62 above described. Then the carriage 24 is set by tightening the nut 23. The foregoing adjustments set the carriage permanently for maintaining the desired radius of oscillation of the lens holding means.

To set the lens properly on the lens holding means so as to be at the correct distance from the center or fulcrum of the holder in order to grind the correct curvature, is the next step in the operation. To accomplish this, the lens holding mechanism is turned up again to an inclined position, as shown by the dotted lines in Fig. 10, away from the grinder. The gauge tube 60 and gauge rod 62 are withdrawn from the spindle and the lens 40 is placed on the lens block 39 and secured in the socket 38 of the spindle 29 and is held in such position by the rod 41 when the nut 43 is tightened, as seen in Fig. 9. Then the rectangular gauge bar 50 is replaced, but before it is replaced, the slide 57 is reset to the right of its former position to make allowance for the thickness of the lens or glass to be ground away, say two m. m. Then the gauge bar 50 is moved to the right, as in Fig. 9, until the setting slide 57 abuts against the housing 28. That will make the distance between the fulcrum of the lens holding mechanism and the grinding face of the grinding wheel equal to the desired grinding radius or radius of oscillation of the lens holding means plus the thickness of the glass to be ground away. It is to be noted that the width of the setting slide 57 is always equal to the distance between the fulcrum 58 of the lens holding mechanism and the adjacent face of the housing 28, see Figs. 6 and 9. Hence, the left-hand face of the setting slide 57 is in exact alignment with the center or fulcrum of the lens holding mechanism. Then the spindle 29 is moved by the finger nut 37 to bring the outer face of the lens against the inner face 155 of the head 55 of the gauge bar 50, as seen in Fig. 9, whereupon the spindle 29 is clamped in its housing by operating the clamp 35. The gauge bar 50 is then removed and this completes the adjustment of the lens holding means for the desired grinding radius and so that when the lens is ground, the ground surface will be at the predetermined radial distance from the center of oscillation 58 and will have the desired curvature.

In operating the machine herein shown, the grinder is rotated and the lens holding means is oscillated by hand, as shown in Fig. 10, so as to move the lens into engagement with the grinder and hold it in such engagement. The lens holding mechanism is oscillated by the handle 27 at the end of the shaft 26, see Fig. 2. In the machine herein shown, this causes the grinder to determine the meridional curvature of the lens and the lens holding means to determine the equatorial curvature thereof.

While the machine herein shown is for generating toric lenses, the invention is not thus limited, as it can be used for grinding other lenses, as the particular invention herein relates to the means in the spindle for aiding in adjusting and predetermining the position of the gauge and, therefore, the center of oscillation of the lens holding means for obtaining the desired grinding radius and ultimate curvature of the lens in one meridian.

The invention claimed is:

1. In a lens grinding machine, the combination with a grinding wheel, and means for holding a lens adjustable towards and from the grinding wheel, of a removable tube longitudinally adjustable in the lens holding means towards and from the grinding wheel, means for securing it to the lens holding means, a gauge rod loosely mounted in said tube, a spring in said tube tending to force the gauge rod outward so its end will engage the grinding wheel, a stop on said tube for limiting the outward movement of the gauge rod against the action of the spring, and means on said tube and gauge rod for indicating the proper position of the rod in the tube.

2. In a lens grinding machine, the combination with a grinding wheel, and means for holding a lens adjustable towards and from the grinding wheel, of a removable tube longitudinally adjustable in the lens holding means towards and from the grinding wheel, means for securing it to the lens holding means, a gauge rod loosely mounted in said tube, a spring in said tube tending to force the gauge rod outward so its end will engage the grinding wheel, a stop on said tube for limiting the outward movement of the gauge rod, said tube being cut away at one point to disclose the rod, and indicating means on the cut portion of the tube and adjacent portion of the rod for indicating, when in registry, the proper position of the tube and rod.

3. In a lens grinding machine, the combination with a grinding wheel, oscillatable means adjustable towards and from the grinding wheel for holding the lens in proper position for treatment by said grinding wheel, a lens holder, and a gauge bar slidably mounted on said lens holding means having a head adapted to be held in front of the lens holder so the gauge bar will indicate the desired radius of oscillation of the lens holder between the fulcrum thereof and the head on said gauge bar, of a gauge rod mounted interchangeably and coaxially with said lens holder and yieldingly mounted in association with said lens holding means and projecting beyond the same to engage the head on said gauge bar, and means for securing said gauge rod to the lens holding means when the gauge rod is adjusted to the head of said gauge bar so that when the gauge bar is removed the lens holding means may be moved up to the grinding wheel to a position determined by engagement of said rod with the grinding wheel so that when the lens holder is substituted for said gauge bar the desired curvature may be ground on the lens by oscillation of the lens holding means.

4. In a lens grinding machine, the combination with a grinding wheel, oscillatable means adjustable towards and from the grinding wheel for holding the lens in proper position for treatment by said grinding wheel, and a gauge bar slidably mounted on said lens holding means having a head adapted to be held beyond the end of the lens holding means so the gauge bar will indicate the desired radius of oscillation of the lens holding means between the fulcrum thereof and the head on said gauge bar, of a removable tube interchangeable with the lens holder and coaxially and longitudinally adjustable in the lens holding means towards and from the grinding wheel, a yieldingly mounted gauge rod in said tube and extending beyond the tube and lens holding means, and means for securing the head of said gauge rod so that when the gauge bar is removed the lens holding means may be moved up to bring the end of the gauge rod into engagement with the grinding wheel and determine the position of the center of oscillation so as to cause the desired curvature to be ground on the lens.

5. In a lens grinding machine, the combination with a grinding wheel, oscillatable means for holding the lens in proper position for treatment by said grinding wheel, and a gauge bar slidably mounted on said lens holding means towards and from the grinding wheel and having a head adapted to be held beyond the end of the lens holding means for indicating the desired radius of oscillation of the lens holding means between the fulcrum thereof and the head on said gauge bar, of a removable tube interchangeable with the lens holder and coaxially and longitudinally adjustable in the lens holding means towards and from the grinding wheel, and a yieldingly mounted gauge rod in said tube and extending beyond the end of the tube and lens holding means, said tube and rod being provided with indicating lines for indicating the proper positions of the two with reference to each other when the rod is extended to the head of the gauge bar.

In witness whereof, I have hereunto affixed my signature.

EDWARD P. DEVINE.